Aug. 10, 1926.
N. B. WOOD
STRAW BALING MACHINE
Filed July 13, 1925    3 Sheets-Sheet 3
1,595,845
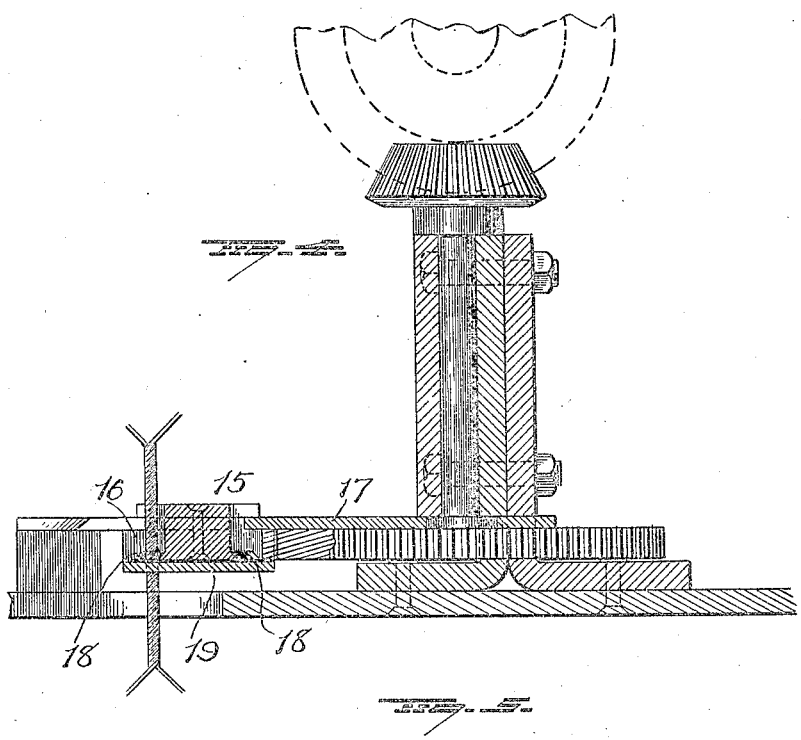
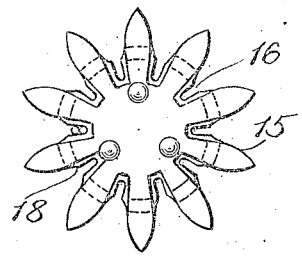
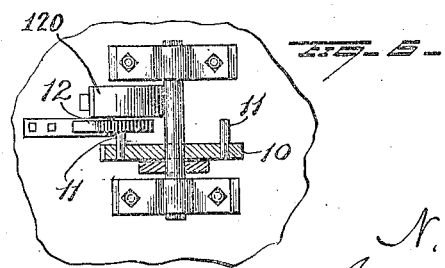
Inventor
N. B. Wood
By Seymour & Bright
Attorneys Patented Aug. 10, 1926.

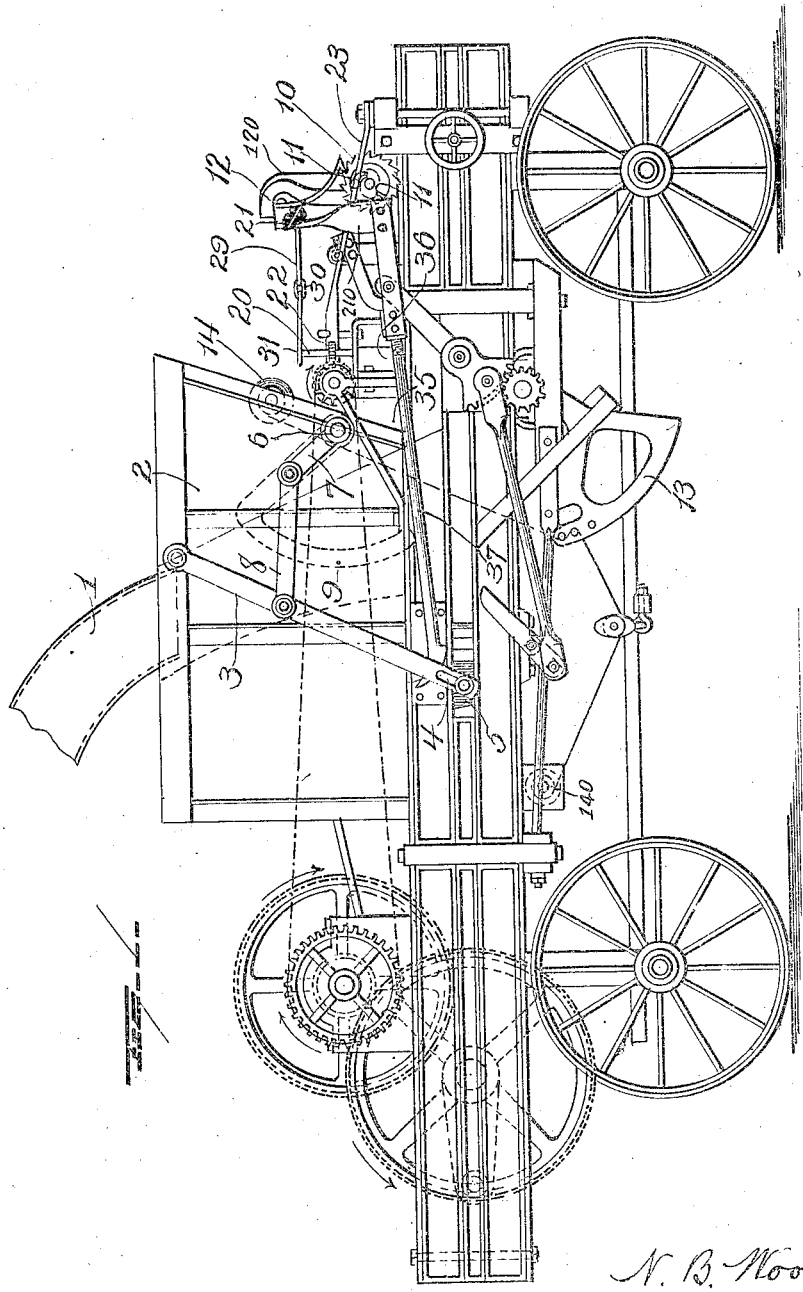

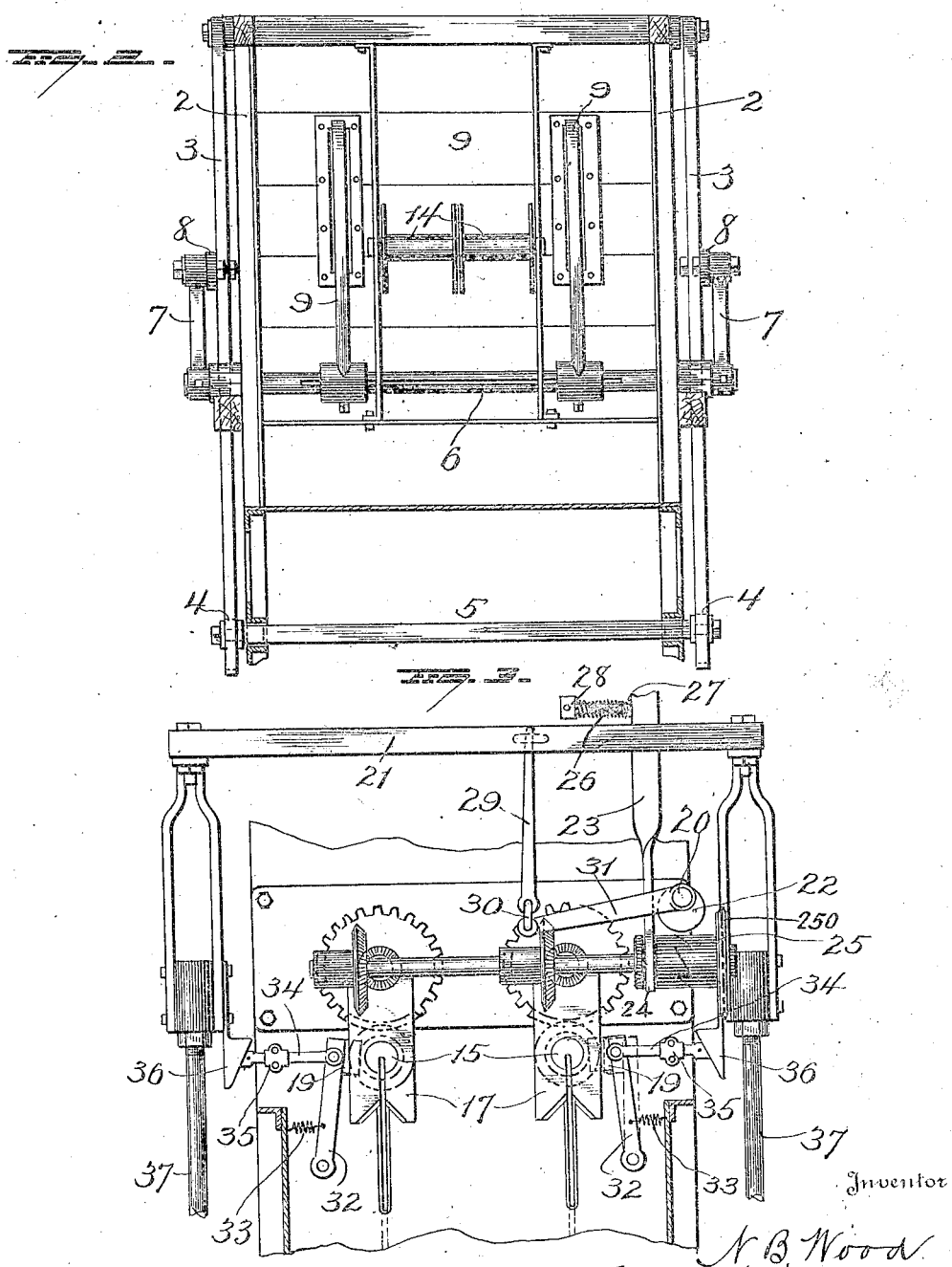

1,595,845

UNITED STATES PATENT OFFICE.

NEWEL B. WOOD, OF JACKSON, OHIO, ASSIGNOR OF ONE-FOURTH TO ARTHUR DAVIS, OF JACKSON, OHIO.

STRAW-BALING MACHINE.

Application filed July 13, 1925. Serial No. 43,300.

My present invention relates to straw-baling machines of the type disclosed in Letters-Patent No. 367,490, granted to me August 2, 1887,—one object of the present improvements being to provide means for severing the binding wire uniformly. The present invention also seeks to simplify the means for actuating the threading frames and to expedite the feeding of the straw into the baling chamber.

The invention is illustrated in the accompanying drawings and will be hereinafter fully set forth and specifically defined.

In the drawings, Figure 1 is a side elevation of so much of a straw-baling machine as is necessary to an understanding of the present invention:

Figure 2 is an end view of the hopper.

Figure 3 is an enlarged detail plan view of a portion of the mechanism.

Figure 4 is an enlarged detail longitudinal section.

Figures 5 and 6 are detail views of parts of the twister and wire-cutter mechanism.

In threshing, the straw is blown from the threshing machine through a long tube 1, and my baling machine is portable so that the hopper 2 thereon may be brought directly under said discharge tube and the straw delivered into the baling machine without any intermediate handling. Pivoted at the top of the hopper is a lever or swinging arm 3, the lower end of which is loosely connected, as at 4, with the traverser or plunger 5 slidably mounted below the hopper and reciprocated longitudinally through convenient mechanism (not shown) to compress the straw in the baling chamber. Across the hopper in the front portion thereof, is a rock-shaft 6 having a crank arm 7 at each end, said crank arm being connected by a link 8 with the adjacent lever 3. Within the hopper, a tramper 9 is carried by the rock shaft in such position that when the plunger is projected forward, the tramper is swung forward out of the way of the straw entering the hopper. When the plunger is retracted, the tramper is swung over upon the straw and exerts sufficient pressure thereon to force it through the outlets of the hopper into the path of the plunger which drives it into and through the compression or baling chamber in the usual manner. It will be understood that the plunger or traveler cuts off the straw in the baling chamber from the incoming straw and prevents straw entering the baling chamber while the wire is being knotted and cut.

In the machine shown and described in my Patent, No. 367,490, above mentioned, endless chains were carried longitudinally through the baling chamber in contact with the top of the straw therein so that they were thereby set in motion. On top of the baling chamber, these chains were operatively connected with and controlled trip devices by which the size of the bales was regulated. In my present machine, the chains are eliminated and a trip wheel 10 is set to work through an opening in the top of the baling chamber and is rotated by the passage of the straw. The trip wheel is equipped with trip pins or studs 11 (best shown in Fig. 6) which act upon a pawl bar 12 to permit or prevent the operation of the needles 13 by the plunger 5 in the manner set forth in my aforesaid patent. It will be understood that while the needles are in lowered position, the straw is forced into the baling chamber and compressed, and when the bale is of the predetermined size the pawl bar is rocked by a trip pin and then the needles may swing upward and carry the wires around the bale.

When the wires from the reel 14 on the hopper and the reel 140 on the bottom of the body or main frame are carried upward behind the bale, they are fed into twisters 15 which are rotated through gearing, the time of operation of which is determined by the trip devices which have just been mentioned. As set forth at length in my aforesaid patent, two wires are joined and extend vertically through the baling chamber in advance of the bale, one wire passing from the reel 14 over the bale and the other wire passing from the reel 140 under the bale to the needle. Mechanism actuated by the bale as it moves through the baling box causes the needle to swing upward in the rear of the bale, so that the wire threaded therein is carried behind and over the bale into the twister where it meets the upper wire, whereupon the twister is operated to twist the wires into two oppositely coiled spirals and sever them between the spirals. In the former machine, however, the point of severance of the wire in actual practice could not be controlled and frequently occurred below the knots or spirals so that the bale was not secured. Therefore, an important object of the present invention is to provide means for positively severing the wire at the proper predetermined point. The twister consists of a disk or circular body having radial notches 16 in its periphery and rotatably mounted in a supporting plate 17 which also serves as a guide to direct the wires into one of the notches 16. On the side walls of each notch, at the bottom thereof, are ribs 18 which restrict the area of the notches so that the wires engaged therein will be closely held and retained. The peripheral portions of the twister body between the ribs 18, indicated by dotted lines in Figure 5, constitute gear teeth to mesh with the actuating member of the twister gearing. The undersides of the twister bodies are flat and smooth, and arranged to cooperate therewith are knives 19 having their cutting edges beveled downwardly from the twisters. Adjacent the twister-driving gearing, a cam shaft 20 is mounted vertically on top of the machine frame, this shaft being controlled by the pawl bar 21 and controlling the clutch which permits or arrests the operation of the twisters. In my present invention, a cam 22 is secured on the cam shaft 20, near the lower end thereof, and bears against one side of a lever 23 which is pivoted at one end upon the top of the machine and has a fork 24 at its free end engaging one member of a clutch 25 whereby the twister-gearing will be started and stopped at proper intervals, the actuating member of the clutch being equipped with a sprocket 250 receiving motion from the main driving shaft of the machine. A spring 26 bears upon the side of the lever 23 remote from the cam 22 and acts in opposition to the cam so that the latter will always be in contact with the lever. The spring 26 may be a leaf spring but I prefer and have shown a coiled spring sustained by a pin or lever 27 projecting laterally from the bar through an abutment 28 against which the spring bears.

As shown most clearly in Figure 3, the cross bar 21 has connected thereto a pitman 29 which is connected by a link 30 to a crank or lever 31 extending from the cam shaft 20.

The knives 19 are arranged at the outer sides of the respective twisters, as shown in Figure 3, and are carried by the free ends of levers or rocking arms 32 which are pivotally secured upon the frame of the press. Retractile springs 33 are arranged between and secured to the outer sides of the levers and an adjacent fixed part of the frame and tend constantly to withdraw the knives from the twisters. At the free ends of the levers, pusher rods 34 are pivoted thereto and extend outwardly therefrom through guides 35 swiveled upon the top of the frame, the outer free ends of the pushers being beveled and having sliding engagement with the wedges 36. The wedges 36 present their inclined faces to the ends of the pushers and are secured on the inner sides of the hook bars 37 which extend from the bar 21 and are actuated by the traveler 5.

Obviously, when the hook bars 37 move forwardly the knives will be withdrawn from the twisters, and as the hook bars return the knives will be projected inwardly to cut the wires, the movements of the several parts being so timed that the knives are retracted and inactive through an interval sufficient to permit the twisted tie or knot to be fully formed. The bale will thus be tied and the upper and lower wires connected so that when the needles are withdrawn, the connected wires will extend across the compression chamber ready for the formation of the next bale. Breaking the wire above or below the knots is thus avoided. The ratchet trip wheel 10 extends peripherally through the top of the baling box to be engaged and actuated by the straw moving through the box. The cross bar 21 is carried by arms 210, rising from the forward ends of the hook bars 37, and is adapted to be held frictionally by the upper end of the pawl bar 12 which is mounted for rocking movement upon a post 120 and is pressed into position to engage over and bear upon the cross bar by a spring (not shown). As long as the cross bar 21 is engaged and held by the upper end of the pawl bar 12, the plunger moves back and forth without engaging the hook bars 37 and this condition will exist until a stud 11 is caused to impinge against the pawl bar, the size of the bale, consequently, being determined by the distance between the trip pins. When a trip pin 11 impinges upon the pawl bar, the bar is rocked and releases the cross bar 21 whereupon the rear ends of the hook bars 37 drop into the path of and are engaged by the ends of the plunger that the bars are drawn rearward by the plunger. Through mechanism not necessary to describe, the rearward travel of the hook bars rocks the needle-carrying shaft so that the needles swing upwardly through the baling chamber behind the bale. There is also mechanism which it is not necessary to describe whereby the needles are withdrawn and the hook bars returned to normal position on the ensuing forward stroke of the plunger. The cross bar 21, of course, moves with the hook bars. When they move rearwardly, the cam 22 is rocked away from the lever 23 so that said lever swings under the influence of the spring 26 and closes the clutch 25 whereupon the twisters will operate. As the movement of the bar continues, the wedges 36 will actuate the push bars 34 and the knives 19 in proper timed relation to the twisters so that the wires will always be cut at the desired point. On the return stroke of the cross bar, the knives are withdrawn and the clutch opened, the twisters thereupon being brought to rest and remaining at rest until another bale is formed.

It is to be understood that various changes may be made in the details of construction without departing from the spirit or scope of my invention; hence I do not limit myself to the particular construction herein set forth.

Having fully described my invention what I claim as new and desire to secure by Letters-Patent, is:

1. In a baling-machine, the combination of a compression chamber, a plunger working therein, twisters mounted above the compression chamber, means for threading binding wires through the chamber about a bale therein and into the twisters, means controlled by the plunger for operating the twisters, knives slidably mounted on the compression chamber at the sides of the twisters and movable beneath the same, yieldable means holding the knives normally from the twisters, and means actuated by the plunger for driving the knives to the twisters whereby to sever twisted wires.

2. In a baling-machine, the combination of a compression chamber, a hopper in communication with the chamber, a plunger working in the compression chamber, a lever pivotally hung on the hopper and having its lower end connected with the plunger, a rock shaft extending across the hopper at one side thereof, a tramper carried by the rock shaft within the hopper, a crank on the rock shaft, and a link connecting the crank and the lever.

3. In a baling-machine including a baling chamber, and a plunger operating therein, the combination of wire-twisters mounted on the baling chamber, rocking arms mounted on the baling chamber adjacent the twisters, knives carried by the free ends of said arms, means for yieldably holding the arms and knives retracted, pushers connected with the arms, and reciprocatory elements mounted on the sides of the baling chamber to be actuated by the plunger and acting on the pushers to project the knives against wires held in the twisters.

In testimony whereof, I have signed this specification.

NEWEL B. WOOD.